US007386746B2

(12) United States Patent
Koarai

(10) Patent No.: US 7,386,746 B2
(45) Date of Patent: Jun. 10, 2008

(54) INFORMATION PROCESSING APPARATUS, METHOD OF STARTING UP THE SAME, AND STARTUP PROGRAM OF THE SAME

(75) Inventor: Manabu Koarai, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 393 days.

(21) Appl. No.: 11/116,318

(22) Filed: Apr. 28, 2005

(65) Prior Publication Data

US 2005/0246565 A1  Nov. 3, 2005

(30) Foreign Application Priority Data

Apr. 30, 2004 (JP) ............................ P2004-135902

(51) Int. Cl.
*G06F 1/00* (2006.01)
(52) U.S. Cl. .................... 713/323; 713/300; 713/320
(58) Field of Classification Search ............... 713/300, 713/320, 323, 2
See application file for complete search history.

(56) References Cited

U.S. PATENT DOCUMENTS

| 5,748,971 | A | * | 5/1998 | Choi et al. .................. 713/320 |
| 5,809,223 | A | * | 9/1998 | Lee et al. ...................... 714/4 |
| 6,438,708 | B1 | * | 8/2002 | Shinichi et al. ............... 714/15 |
| 2003/0110331 | A1 | * | 6/2003 | Kawano et al. ............... 710/58 |

FOREIGN PATENT DOCUMENTS

| CN | 1504859 A | 6/2004 |
| JP | 2002-324012 | 11/2002 |

OTHER PUBLICATIONS

Notification of the First Office Action issued by the Chinese Patent Office on Jan. 19, 2007, for Chinese Patent Application No. 200510106716.0, and English-language translation thereof.

* cited by examiner

*Primary Examiner*—Thomas Lee
*Assistant Examiner*—Malcolm D Cribbs
(74) *Attorney, Agent, or Firm*—Finnegan, Henderson, Farabow, Garrett & Dunner, L.L.P.

(57) ABSTRACT

An information processing apparatus, having a hibernation state, includes a hibernation controller that stores information required to resume the information processing apparatus from the hibernation state to an arbitrary operational state when the information processing apparatus is shifted from the arbitrary operational state to the hibernation state and that turns off the information processing apparatus; a determiner determining whether the information processing apparatus is started up from the hibernation state when the information processing apparatus is turned on after the information processing apparatus is turned off by the hibernation controller; and a resume controller returning the information processing apparatus from the hibernation state to the arbitrary operational state based on the required information when the determiner determines that the information processing apparatus is resumed from the hibernation state.

8 Claims, 6 Drawing Sheets

INFORMATION PROCESSING APPARATUS, METHOD OF STARTING UP THE SAME, AND STARTUP PROGRAM OF THE SAME

CROSS-REFERENCE TO RELATED APPLICATIONS

This application claims the benefit of priority of Japanese Patent Application No. 2004-135902, filed Apr. 30, 2004, the entire contents of which are incorporated herein by reference.

BACKGROUND

1. Field

The present invention relates to information processing apparatuses, methods of starting up the information processing apparatuses, and startup programs of the information processing apparatuses. Particularly, the present invention relates to an information processing apparatus capable of being started up from a hibernation state, a method of starting up the information processing apparatus, and a startup program of the information processing apparatus.

2. Description of the Related Art

The power consumption of information processing apparatuses tends to increase as the information processing apparatuses have become sophisticated and faster in recent years. On the other hand, various technologies of reducing the power consumption in the information processing apparatuses are under development with the object of decreasing the calorific value and of energy saving.

Particularly, in portable information processing apparatuses typified by notebook computers, there is a great need for electric power saving because power is supplied from batteries, such as secondary cells, to the portable information processing apparatuses.

In order to satisfy such a need, for example, a method in which the operation of an information processing apparatus is automatically suspended when a user does not operate the information processing apparatus for a predetermined time period and a predetermined device in the information processing apparatus is turned off to reduce power requirements has been adopted hitherto.

In another method of reducing power requirements, an information processing apparatus is set to a suspended state called a standby state. In the standby state, the devices, other than the main memory and the video memory, in the information processing apparatus are turned off.

The main memory and the video memory store information required to return the information processing apparatus to the state immediately before the suspension when the information processing apparatus is resumed from the suspended state. Accordingly, when the information processing apparatus is resumed from the standby state, or the suspended state, by the user who presses an arbitrary key on the keyboard or the power switch, the information processing apparatus can resume the operation from the screen state or operational state immediately before the suspension.

Although the main devices, including the central processing unit (CPU) and the display, are turned off in the standby state, it is necessary to continue to supply power to the main memory and the video memory for maintaining the content of storage.

Consequently, for example, when the information processing apparatus is driven only by the battery, a long standby state exhausts the power in the battery and, as a result, the information processing apparatus eventually loses the content of the main memory and the video memory.

In contrast, there is a method which has a high power saving function and in which the information processing apparatus is set to a dormant state, or a hibernation state.

In the hibernation state, or the dormant state, all the devices in the information processing apparatus are turned off after the state immediately before the halt of the information processing apparatus is stored in a nonvolatile memory, such as the hard disk.

Since there is no need to supply power to the main memory and the video memory in the hibernation state, the power consumption is none in principle (a weak power is supplied to some parts, such as a built-in clock function). Hence, it is possible to halt the information processing apparatus for a long time and, therefore, the hibernation state is particularly advantageous for the operation of the information processing apparatus using the battery as the power supply.

In order to shift the information processing apparatus to the hibernation state, it is necessary to control storage of information required to resume the operation in a predetermined area in the hard disk in a predetermined procedure. In order to resume the information processing apparatus from the hibernation state, it is necessary to control return of the information stored in the predetermined area in the hard disk to the main memory and the video memory.

The control relating to the shift to and resume from the hibernation state (hereinafter referred to as hibernation control) is performed by basic software called a basic input/output system (BIOS), stored in a read only memory (ROM), or by an operating system (hereinafter referred to as the OS).

Although the BIOS has played a leading role in the hibernation control, the hibernation control is shifting from the BIOS-driven control to the OS-driven control with the object of easily addressing the diversity of devices connected to the information processing apparatus in recent years (for example, Jpn Pat. Publication No. 2002-324012).

As described above, the hibernation control can reduce the power consumption of the information processing apparatus in the halt state to zero in principle. In addition, the information processing apparatus can resume the operational state immediately before the halt of the information processing apparatus in resuming from the hibernation state.

In the OS-driven hibernation control, the OS can issue instructions to drivers to store and restore the states of various external devices as long as the drivers of the various external devices (including a card compliant with a peripheral component interconnect (PCI) standard, such as an audio card) connected to the information processing apparatus support the function of the hibernation control.

Since the BIOS must have the control function separately supporting the connected external devices in known BIOS-driven hibernation control, it is difficult to perform the hibernation control for an external device newly added unless the software in the BIOS is changed.

The OS-driven hibernation control can resolve the above problem.

In the OS-driven hibernation control, after a shift request to the hibernation is submitted, the OS stores a variety of information required to resume from the hibernation state in the hard disk and, then, issues a power off instruction. The power supply to each device in the information processing apparatus is stopped in response to the power off instruction to shift the information processing apparatus to the hibernation state.

In the return from the hibernation state, the BIOS is started up in the same manner as in normal startup. After the BIOS performs predetermined processes, the OS is started up.

After the OS is started up, the OS restores the variety of information for the return, stored in the predetermined area in the hard disk, to various devices, including the main memory and the video memory, to resume the information processing apparatus to the state immediately before the hibernation.

In known methods, the same process as in the normal startup is performed in the return from the hibernation state by the BIOS.

Accordingly, in the known OS-driven hibernation control, the same BIOS software can be used in the normal startup and in the return from the hibernation state.

However, the normal startup process performed by the BIOS also includes processes that are not indispensable for the return for the hibernation state and, therefore, there is room for improvement in the known OS-driven hibernation control in terms of the time required for the return from the hibernation state.

In addition, the normal startup process performed by the BIOS includes a setup process in which the user changes the parameters of the devices connected to the information processing apparatus.

It is important to reliably return to the operational state immediately before the hibernation in the hibernation and return control. Accordingly, there is also room for improvement in the known methods, which allows the user to change the parameters of the devices in the return control from the hibernation state, in terms of the reliability of the process.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

An information processing apparatus, a method of starting up the information processing apparatus, and a startup program of the information processing apparatus according to embodiments of the present invention will be described below with reference to the attached drawings.

Figure 1:
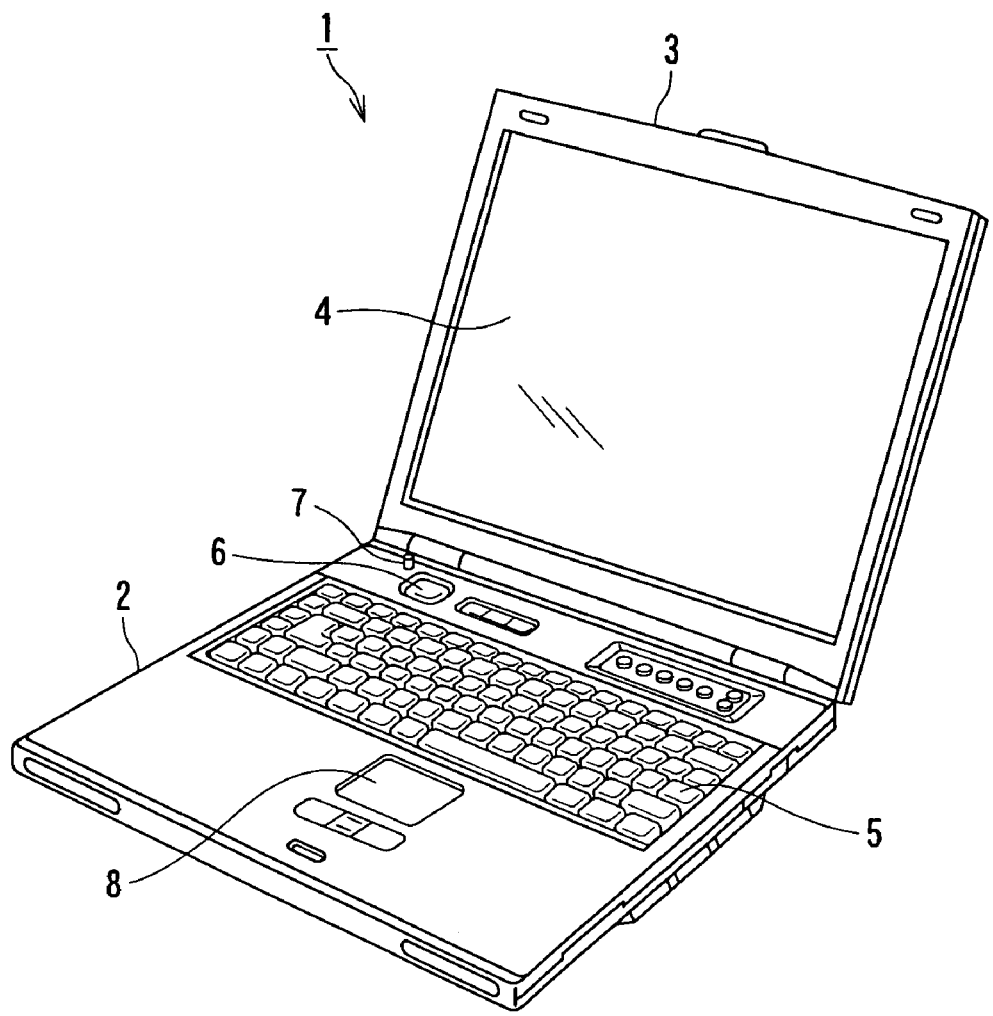
FIG. 1 is an external view of an information processing apparatus according to an embodiment of the present invention.

FIG. 1 is an external view of an information processing apparatus 1 according to an embodiment of the present invention.

The information processing apparatus 1, typified by a personal computer, has the thin rectangular main body 2 thereof and a fold-down panel 3 that is attached to the information processing apparatus 1.

The panel 3 has a display 4, for example, a liquid crystal display (LCD).

A keyboard 5 used for inputting a variety of information and a pointing device 8 used for pointing to a specific position in the display 4 are provided on the top face of the main body 2 of the information processing apparatus 1.

A power switch 6 used for starting up the information processing apparatus 1 and a panel opening-closing detection switch 7 that detects the opening and closing of the panel 3 are also provided on the top face of the main body 2 of the information processing apparatus 1.

The size and shape of the information processing apparatus 1 according to the embodiment of the present invention is not limited to those shown in FIG. 1. The arrangement, sizes, and shapes of the components, including the display 4 and the keyboard 5, are also not limited to those shown in FIG. 1.

Figure 2:
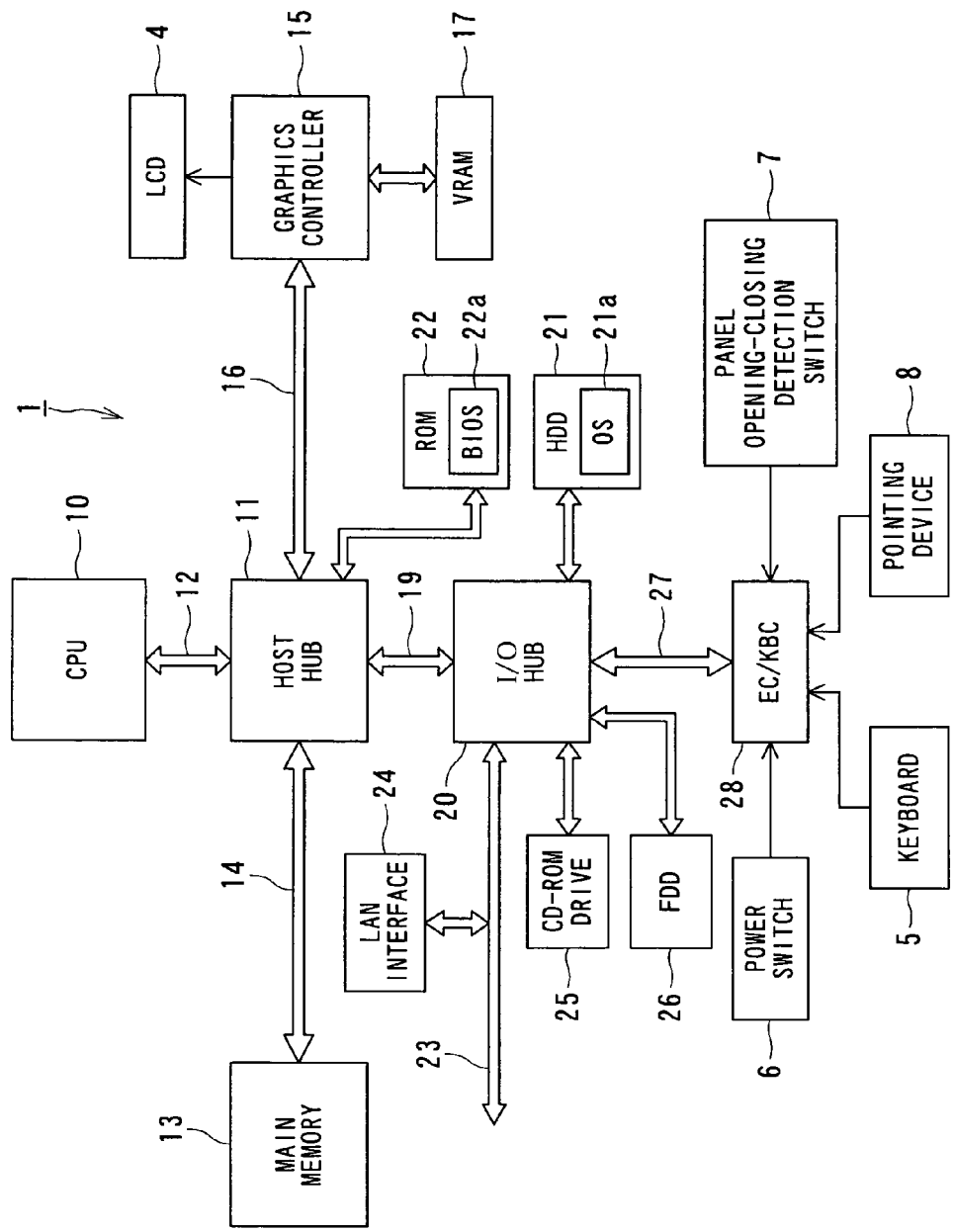
FIG. 2 is a block diagram showing the structure of the information processing apparatus according to an embodiment of the present invention.

FIG. 2 is a block diagram showing the structure of the information processing apparatus 1 according to an embodiment of the present invention.

A CPU 10 is connected to a host hub 11 through a CPU bus 12.

The CPU 10 executes an operating system (OS) and various application/utility programs that are loaded from an hard disk drive (HDD) 21, which an external storage device (removable storage device), to a main memory 13 through an input-output (I/O) hub 20, the host hub 11, and a memory bus 14.

The host hub 11 is connected to high-speed devices. Specifically, the host hub 11 is connected to the main memory 13 through the memory bus 14 and is connected to a graphics controller 15 through, for example, an accelerated graphics port (AGP) bus 16.

The host hub 11 is also connected to a BIOS ROM 22.

The host hub 11 is further connected to the I/O hub 20 through a bus 19, such as a hub interface.

The I/O hub 20 is connected to the HDD 21, which is an external storage device.

The I/O hub 20 is also connected to a compact disc read only memory (CD-ROM) drive 25 and to a floppy disk drive (FDD) 26, in addition to the HDD 21.

The I/O hub 20 is further connected to a peripheral component interconnect (PCI) bus 23, to which various devices, including a local are network (LAN) interface 24 in FIG. 2, conforming to the PCI bus standard are connected. The LAN interface 24 is connected to an LAN or the Internet, if required.

A low pin count (LPC) bus 27, which transmits data at a relatively low speed, is connected to the I/O hub 20. For example, an embedded controller/keyboard controller (EC/KBC) 28, which is an embedded controller, is connected to the LPC bus 27. The keyboard 5, the power switch 6, the panel opening-closing detection switch 7, the pointing device 8, and others are connected to the EC/KBC 28.

Even when the information processing apparatus 1 is turned off, power is supplied to the EC/KBC 28 from, for example, a battery. The EC/KBC 28 detects the power switch 6 that is pressed to start a startup sequence of the information processing apparatus 1.

The keyboard 5 is a typical input device of the information processing apparatus 1 and is connected to the EC/KBC 28.

The BIOS ROM 22, which is, for example, a flash memory, stores a program called a BIOS 22a.

The BIOS 22a is a program started up when the information processing apparatus 1 is turned on. The BIOS 22a is capable of performing a predetermined operation, when the information processing apparatus 1 is turned on, to determine the settings relating the system of the information processing apparatus 1, unlike programs, including the OS and the application software, stored in the external storage device such as the HDD 21.

The BIOS 22a stored in the BIOS ROM 22 is executed by the CPU 10.

The graphics controller 15 displays the data drawn in a video memory 17 by the OS or the application software in the display 4.

Figure 3:
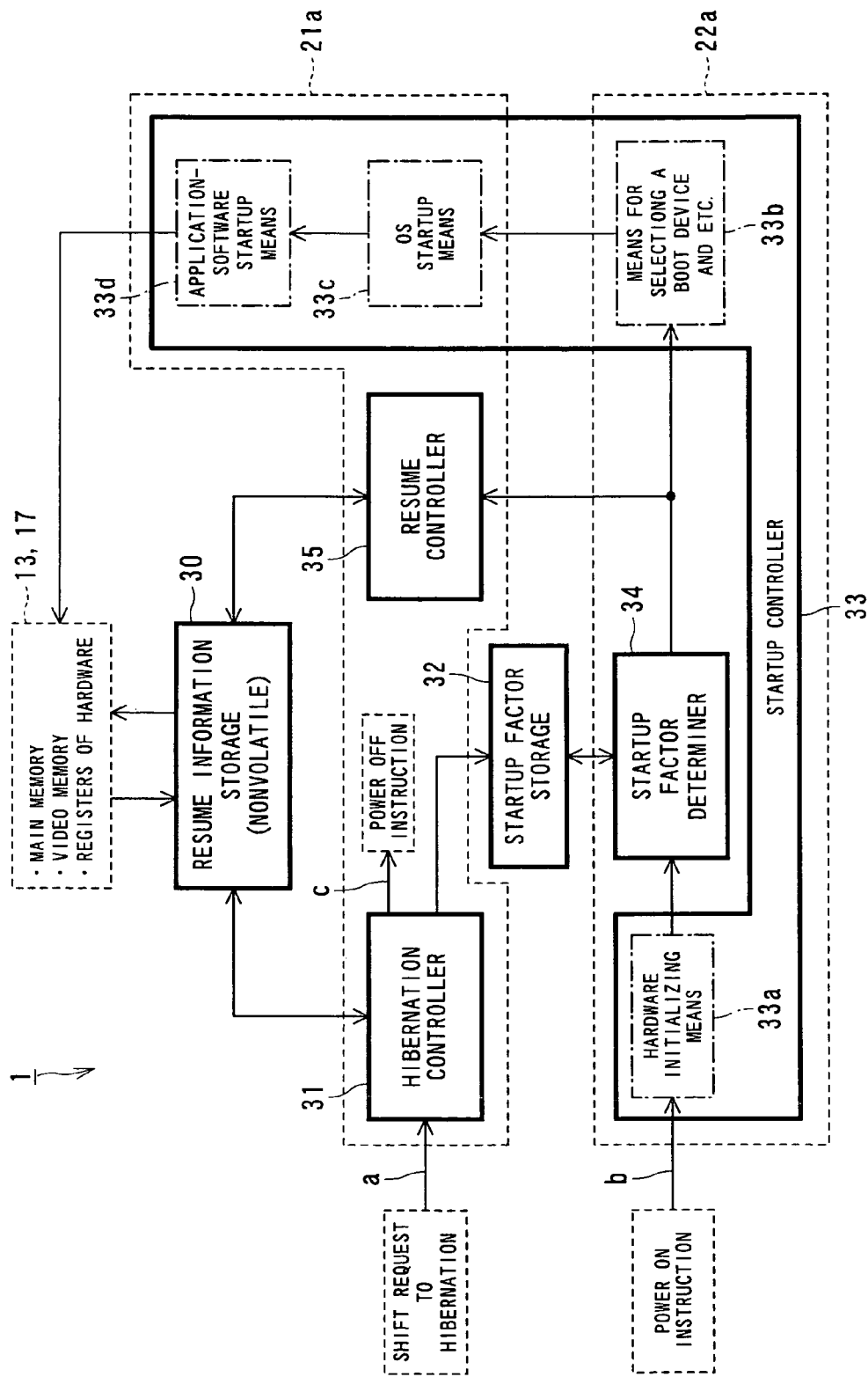
FIG. 3 is a block diagram showing the functional structure of the information processing apparatus according to an embodiment of the present invention.

FIG. 3 is a block diagram showing the functional structure of hibernation control and return control of the information processing apparatus 1 according to an embodiment of the present invention.

The information processing apparatus 1 includes a resume information storage 30, a hibernation controller 31, and a startup factor storage 32. The resume information storage 30 stores information required to resume the information processing apparatus to an operational state immediately before hibernation. The hibernation controller 31 (means for storing data and means for turning off) controls the storage of information in the resume information storage 30 in response to a predetermined shift request "a" to the hibernation, the shift request "a" being generated by each component of the information processing apparatus 1. The startup factor storage 32 stores a startup factor depending on a power off state.

The information processing apparatus 1 also includes a startup controller 33, a startup factor determiner 34, and a resume controller 35. The startup controller 33 controls normal startup of the information processing apparatus 1 in response to a power on instruction "b". The startup factor determiner 34 (means for determining) determines a startup factor based on the information supplied from the startup factor storage 32. The resume controller 35 (means for resuming) performs control required to restore the information stored in the resume information storage 30 to the main memory 13, the video memory 17, or registers of a variety of hardware if the startup factor is a return from the hibernation.

The startup controller 33 includes, as the detailed components, means for realizing functions, including hardware initialization means 33a, means 33b for selecting a boot device and etc., OS startup means 33c, and application-software startup means 33d.

The shift request "a" to the hibernation is submitted in various modes. For example, the shift request "a" is automatically submitted when a user does not operate the keyboard 5 or the pointing device 8 of the information processing apparatus 1 for a predetermined time period.

The shift request "a" to the hibernation is also submitted when the user selects [Hibernation] from the screen of a shutdown menu to turn off the power.

Furthermore, depending on the settings in the OS, the shift request "a" to the hibernation is submitted in response to pressing of the power switch 6 or closing of the panel 3 detected by the panel opening-closing detection switch 7.

Figure 4:
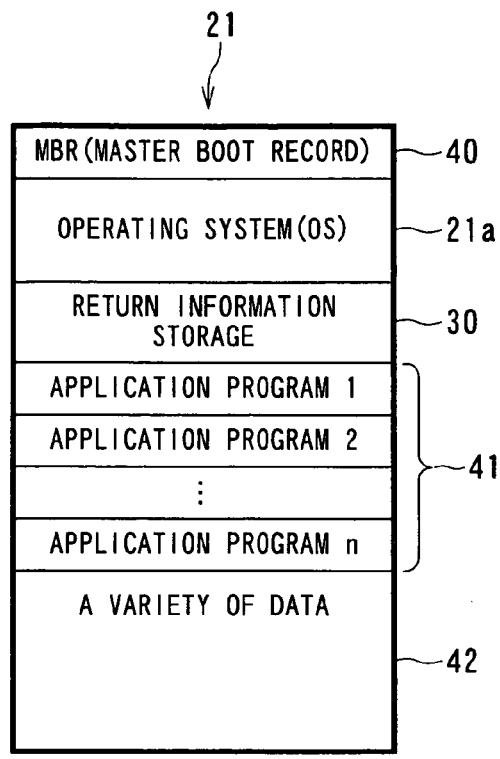
FIG. 4 shows an example of the content of information stored in an HDD of the information processing apparatus, according to an embodiment of the present invention.

The resume information storage 30 is provided in, for example, a predetermined storage area in the HDD 21 shown in FIG. 4. The resume information storage 30 stores a variety of information required to resume the information processing apparatus to the original operational state. The variety of information includes the information stored in the main memory 13, the information stored in the video memory 17, and the set state of other hardware, in the operational state of the information processing apparatus 1 when the shift request "a" to the hibernation is submitted.

Various application programs 41 and a variety of data 42 are stored in the remaining storage areas in the HDD 21 shown in FIG. 4, along with an OS 21a and a master boot record (MBR) 40 required to initially startup the OS 21a.

The hibernation controller 31 monitors the shift request "a" to the hibernation. When the shift request "a" to the hibernation is submitted, the hibernation controller 31 controls storage in the resume information storage 30 of the variety of return information required to resume the information processing apparatus to the original operational state, described above.

The hibernation controller 31 issues a power off instruction "c", after the return information is stored in the resume information storage 30, to turn off the power.

The hibernation controller 31 is realized as, for example, part of the function of the OS 21a.

Figure 5:
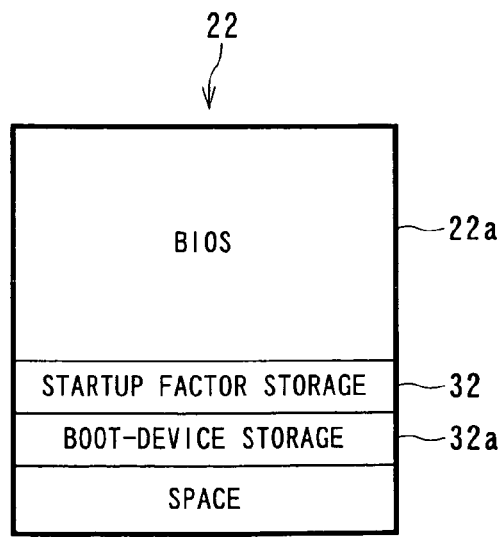
FIG. 5 shows an example of the content of information stored in a BIOS ROM of the information processing apparatus, according to an embodiment of the present invention.

The startup factor storage 32 is provided in, for example, a predetermined area in the BIOS ROM 22 storing the BIOS 22a, shown in FIG. 5. Information indicating whether the startup factor is the return from the hibernation or the normal startup is stored in the startup factor storage 32.

The BIOS ROM 22 also includes a boot-device storage area (startup device storage area) 32a in which identification information concerning the boot device, used for starting up the OS, is stored. In the return control, referring to the information stored in the boot-device storage area 32a can identify the boot device used in the previous startup.

The startup controller 33 is means for performing the normal startup of the information processing apparatus 1 in response to the power on instruction "b".

The power on instruction "b" is submitted in various modes. The power on instruction "b" is submitted, for example, when the user presses the power switch 6. Furthermore, depending on the settings in the OS, the power on instruction "b" is submitted in response to pressing of any key on the keyboard 5 or opening of the panel 3.

The startup factor determiner 34 is means for determining whether the startup factor is the return from the hibernation or the normal startup based on the information stored in the startup factor storage 32.

The startup factor determiner 34 is realized as initial control means for starting up the OS upon power on, for example, as part of the BIOS 22a.

The resume controller 35 is means for controlling the return of the information stored in the resume information storage 30 to the main memory 13, the video memory 17, or the registers of a variety of hardware. With the function of the resume controller 35, the information processing apparatus 1 returns to the operational state immediately before the hibernation.

The resume controller 35 is realized, for example, as part of the function of the OS 21a.

Figure 6:
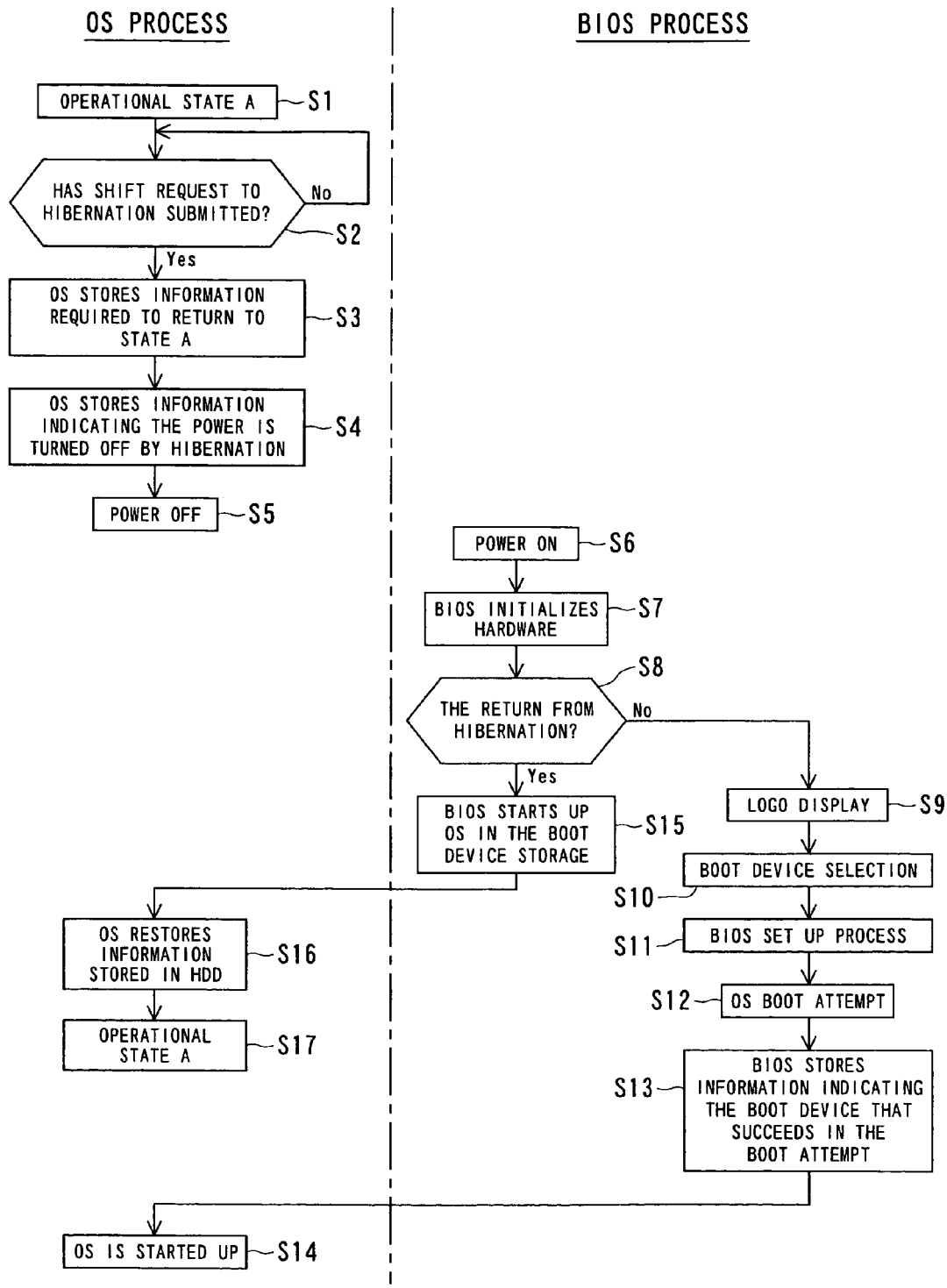
FIG. 6 is a flowchart showing a hibernation control process and a return control process of the information processing apparatus, according to an embodiment of the present invention.

FIG. 6 is a flowchart showing a hibernation control process and a return control process of the information processing apparatus 1 typified by a personal computer, according to an embodiment of the present invention. The hibernation control process and the return control process will now be described with reference to FIG. 6.

An operational state A in Step S1 represents an arbitrary operational state of the information processing apparatus 1. For example, the operational state A represents an arbitrary operational state in document preparation software or spreadsheet that is started up under the control of the OS.

In Step S2, the OS determines whether a shift request to hibernation is submitted in an arbitrary operational state.

The shift request to the hibernation is submitted to the OS in various modes. For example, the shift request to the hibernation is automatically submitted when the user does not operate the keyboard 5 or the pointing device 8 of the information processing apparatus 1 for a predetermined time period.

If the OS detects an occurrence of the shift request to the hibernation in Step S2, that is, if the determination is affirmative in Step S2, then in Step S3, the OS stores a variety of information required to resume the information processing apparatus to the operational state A in the nonvolatile resume information storage 30. The variety of information includes the information stored in the main memory 13, the information stored in the video memory 17, and the set state of other hardware in the operational state A at this time.

The resume information storage 30 is provided in, for example, a predetermined storage area in the HDD 21.

In Step S4, the OS stores information indicating that the power is to be turned off by the hibernation, for example, a specified flag, in a nonvolatile memory (the startup factor storage 32) before the power is turned off.

Although the nonvolatile memory is not particularly limited, it is preferable that the nonvolatile memory be provided in a predetermined area in an existing nonvolatile memory, such as the BIOS ROM 22, for simplifying the structure of the information processing apparatus 1.

Even when the power is to be turned off by the normal power off, the OS stores the information indicating that the power is to be turned off by the normal power off in the nonvolatile memory (the startup factor storage 32) in Step S4. The normal power off means a process in which the power is turned off after the OS terminates the application program in a predetermined sequence and the OS itself is terminated. The normal power off differs from the power off by the hibernation in that the information processing apparatus cannot be returned to the original state upon next startup.

In Step S5, the OS turns off the power to put the information processing apparatus 1 in the hibernation.

Since the information required to resume the information processing apparatus from the hibernation to the operational state A is stored in the nonvolatile storage, such as the HDD 21, no information is lost even when the information processing apparatus 1 is completely turned off, thus attaining a superior power saving function.

Steps 2 to 5 are performed by the hibernation controller 31 in the functional structure in FIG. 3.

The return control process from the hibernation is performed in a startup sequence shown in steps subsequent to Step S5.

This startup sequence is performed by the initial control means before the OS is started up. The initial control means is mainly performed by, for example, the BIOS 22a stored in the nonvolatile memory called the BIOS ROM 22. The BIOS ROM 22 is, for example, a flash memory.

In Step S6, pressing the power switch 6 turns on the power. In Step S7, the BIOS 22a initializes the hardware.

The initialization of the hardware includes a clear process performed by the main memory 13 or the video memory 17, a reset process performed by each register, self-check including memory check, performed by the hardware, and a predetermined initialization process for the register or port in the hardware.

In Step S8, the BIOS 22a refers to the information stored in the BIOS ROM 22 (the startup factor storage 32) to determine whether the return from the hibernation or the startup from the normal power off is performed.

If the BIOS 22a determines that the startup from the normal power off is performed, that is, if the determination is negative, then in Step S9, the BIOS 22a causes the display 4 to display, for example, the name of the manufacturer of the information processing apparatus 1 for a predetermined time period. This process is a called logo display process.

In Step S10, the BIOS 22a performs a boot device selection process. The boot means starting up the OS. The boot device means a device in which the OS to be started up is stored and mainly means an external storage device.

On the assumption that the OS to be normally started up is an $OS_1$, the $OS_1$ is generally stored in the HDD 21. In addition, recording media having $OS_2$ and $OS_3$, different from the $OS_1$, recorded may be loaded in the CD-ROM drive 25 and the FDD 26, respectively.

In such a case, it is necessary to select a boot device whose OS is started up by priority from among the HDD 21, the CD-ROM drive 25, and the FDD 26, which are the boot devices.

In the boot device selection process, the BIOS 22a waits for a specific key operation by the user, for example, during the logo display process (e.g., for a few seconds) in Step S9, and stops the startup process once if the specific key operation is performed to instruct the user to select a boot device having a highest priority from a menu.

In Step S11, the BIOS 22a performs a BIOS setup process. The BIOS 22a determines predetermined initialization settings for the register or port of the hardware in the hardware initialization process in Step S7, and many of the initialization settings can be changed. A process of changing the initialization settings in the BIOS 22a is called the BIOS setup process.

Also in the BIOS setup process, the BIOS 22a waits for a specific key operation by the user, for example, during the logo display process (e.g., for a few seconds) in Step S9, and stops the startup process once if the specific key operation is performed to instruct the user to select various parameters from a menu.

In Step S12, the BIOS 22a performs an OS boot attempt. The boot devices storing the OSs to be started up (booted up) are assigned priorities in advance. A boot device having the highest priority may be selected to change its priority in Step S10.

In the OS boot attempt, the BIOS 22a sequentially checks whether the boot devices can be booted up in descending order of the priority. For example, it is assumed that the first priority is assigned to the CD-ROM drive 25, the second priority is assigned to the FDD 26, and the third priority is assigned to the HDD 21. In this case, the CD-ROM drive 25 is first checked in the OS boot attempt. When no CD-ROM recording the OS is loaded in the CD-ROM drive 25 or when the CD-ROM recording, for example, application software other than the OS is loaded in the CD-ROM drive 25, it is determined that the OS boot attempt fails and the FDD 26 having the second priority is checked.

In Step S13, the BIOS 22a stores the information indicating the boot device that succeeds in the OS boot attempt in the nonvolatile memory (the boot-device storage area 32a) in order to reduce the return time in the return from the hibernation.

Although the nonvolatile memory (boot-device storage area 32a) is not limited, it is preferable that the nonvolatile memory be provided in a predetermined area in an existing nonvolatile memory, such as the BIOS ROM 22, for simplifying the structure of the information processing apparatus 1.

In Step S14, the BIOS 22a starts up the OS in the boot device that succeeds in the OS boot attempt.

If the BIOS 22a determines that the startup factor is the return from the hibernation in Step S8, that is, if the determination is affirmative in Step S8, then in Step S15, the BIOS 22a starts up the OS in the boot device stored in the nonvolatile memory (boot-device storage area 32a).

The process after starting up the OS is shifted to the OS-driven process.

In Step S16, the OS restores the information stored in the resume information storage, such as the HDD 21, to the main memory 13, the video memory 17, and the register in the hardware.

In Step S17, the information processing apparatus 1 returns to the operational state A as a result of the return process in Step S16.

When the operational state A in Step S1 is a state in which a document is preparing, the document preparation is continued in Step S17.

The hibernation control and the return control of the information processing apparatus 1 are performed in the manner described above according to the embodiment of the present invention.

Figure 7:
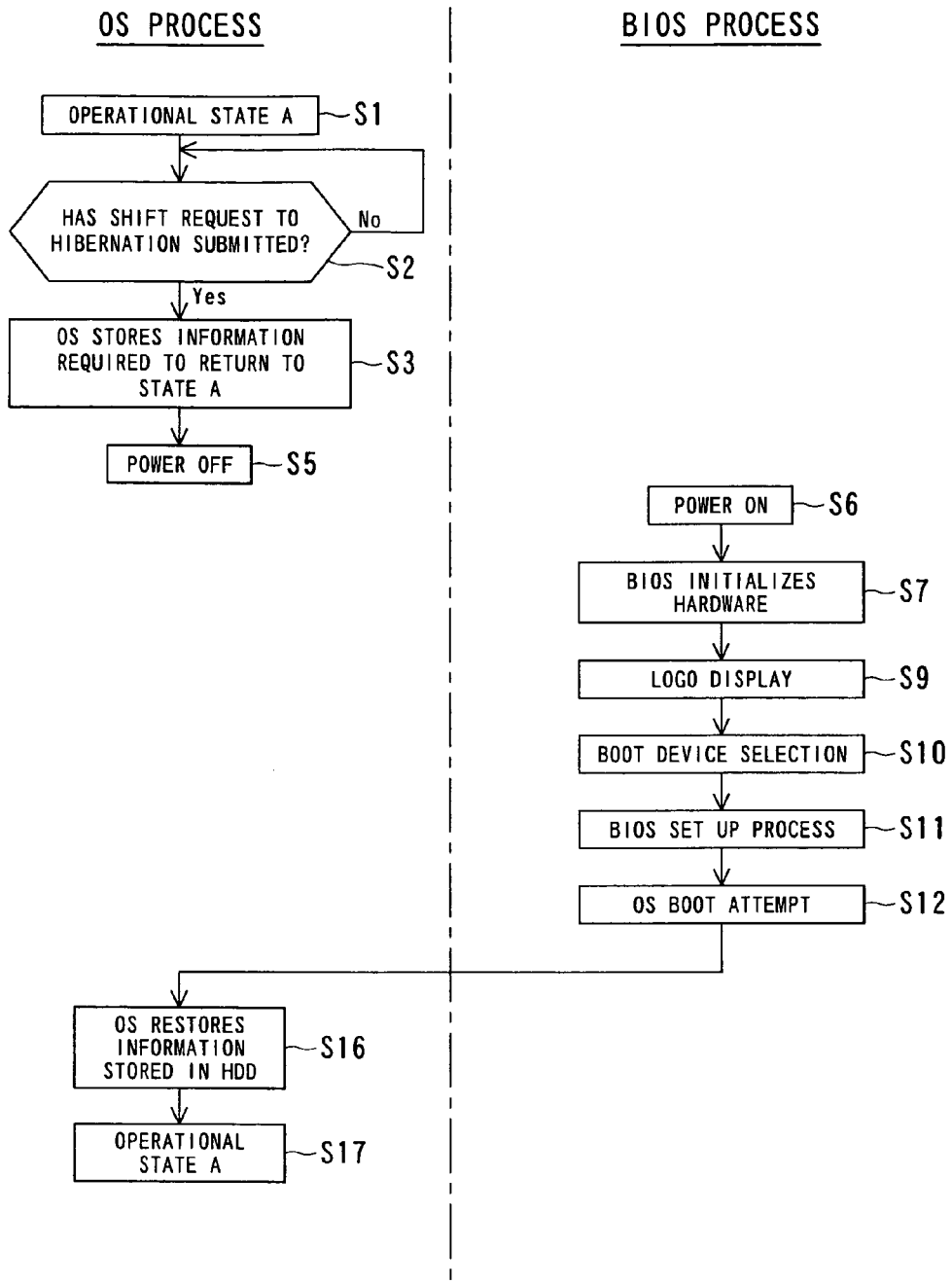
FIG. 7 is a flowchart showing a hibernation control process and a return control process of a known information processing apparatus.

FIG. 7 is a flowchart showing a hibernation control process and a return control process of a known information processing apparatus. The same step numbers are used in FIG. 7 to identify the same steps shown in FIG. 6.

In the return control of the known information processing apparatus, the startup whose startup factor is the return from the hibernation is not especially separated from the normal startup. After the return information is stored in the HDD 21 in Step S3, then in Step S5, the OS turns off the power. In the return control of the known information processing apparatus, the determination of the startup factor (Step S8 in FIG. 6) is omitted. Even in the return from the hibernation, the process as in the normal startup, that is, the steps from the hardware initialization in Step S7 to the OS boot attempt in Step S12, excluding Step S8, are performed.

The return from the hibernation is intended for accurate return to the operational state A immediately before the hibernation. With this object, the boot device selection process in Step S10 is not indispensable in the return from the hibernation. This is because it is sufficient to select the OS running in the operational state A, that is, the boot device used in the previous startup.

In the return control according to the embodiment of the present invention, shown in FIG. 6, some steps in the known return control are skipped. In stead of Step 9 to 13, only Step 15 is performed in the case of the return from the hibernation.

In the return control according to the embodiment of the present invention, the boot device selection process in Step S10 is skipped in the return from the hibernation. This skip can reduce the processing time and can also avoid a situation in which a boot device different from the boot device used in the previous startup is selected due to a wrong operation by the user and, as a result, reliable return is not assured.

In the return control according to the embodiment of the present invention, the OS boot attempt in Step S12 is also skipped. It is sufficient to limit the boot device to the one used in the previous startup.

In addition, in the return control according to the embodiment of the present invention, the BIOS setup process in Step S11 is also skipped. In order to restore the operational state A, it is not necessary to change the setup of the hardware or the like. Allowing the user to change the setup in the return control is not preferable with the object of the reliability of the return.

Skipping of the BIOS setup process in Step S11 can further shorten the process required for the return.

The logo display process in Step S9 has a function of notifying the user of a period during which a specific key operation is allowed, in addition to the function of displaying the logo of the manufacturer etc. in the display 4. In other words, a specific key can be operated during the logo display period to display a menu screen required in the boot device selection process and the BIOS setup process.

Accordingly, the logo display process in Step S9 can be skipped along with the boot device selection process in Step S10 and the BIOS setup process in Step S11 without problem.

In the return control of the information processing apparatus 1 according to the embodiment of the present invention, skipping Steps 9 to 12, which were performed in the known return control, can speed up the return control.

Skipping the boot device selection process in Step S10 and the BIOS setup process in Step S11 can avoid the situation in which the operational state immediately before the hibernation is modified due to a wrong operation by the user, so that the reliability of the return control can be ensured.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. An appropriate combination of the multiple components in the disclosed embodiments of the present invention can provide various aspects of the present invention. For example, some components may be deleted from the components in the above disclosed embodiments.

What is claimed is:

1. An information processing apparatus having a hibernation state, the information processing apparatus comprising:
   means for storing data required to resume a state of information processing apparatus from the hibernation state to an arbitrary operational state when the state of the information processing apparatus is shifted from the arbitrary operational state to the hibernation state;
   means for turning off the information processing apparatus after the state of the information apparatus is shifted to the hibernation state;
   means for turning on the information processing apparatus with a plurality of turning-on processes;

means for determining whether the state of information processing apparatus is resumed from the hibernation state when the information processing apparatus is turned on after the information processing apparatus is turned off;

means for resuming the state of the information processing apparatus from the hibernation state to the arbitrary operational state based on the required data when the means for determining determines that the state of the information processing apparatus is resumed from the hibernation state;

a first device which has a first operating system;

a second device which has a second operating system;

means for storing an identification of a device whose operating system is used to start up the information processing apparatus;

means for selecting one of the first device and the second device based upon the stored identification; and wherein, the means for resuming includes means for skipping at least one of the turning-on processes which is not indispensable for resuming when the determining means determines that the state of the information processing apparatus is resumed from the hibernation state, and wherein, one of the first operating system and the second operating system in the selected device is started up when the state of the information processing apparatus resumes from the hibernation state to the arbitrary operational state.

2. The information processing apparatus according to claim 1, wherein the state of the information processing apparatus is booted based on a normal boot-up sequence when the means for determining determines that the state of the information processing apparatus is not resumed from the hibernation state.

3. The information processing apparatus according to claim 1, wherein the means for storing and the means for turning off are included in an operating system of the information processing apparatus.

4. The information processing apparatus according to claim 1, wherein the means for determining is included in a BIOS.

5. A method of starting up an information processing apparatus having a hibernation state, the method comprising:

storing information required to resume the information processing apparatus from the hibernation state to an arbitrary operational state when the information processing apparatus is shifted from the arbitrary operational state to the hibernation state;

turning off the information processing apparatus;

turning on the information processing apparatus with a plurality of turning-on processes;

determining whether the information processing apparatus is resumed from the hibernation state when the information processing apparatus is turned on after the information processing apparatus is turned off; and resuming the information processing apparatus from the hibernation state to the arbitrary operational state based on the required information when it is determined in the determining step that the information processing apparatus is resumed from the hibernation state, wherein, the resuming step includes skipping at least one of the turning on processes which is not indispensable for resuming the information processing apparatus when it is determined in the determining step that the information processing apparatus is resumed from the hibernation state, wherein the information processing apparatus further includes a plurality of devices capable of providing a plurality of operating systems, wherein an identification of a device among the plurality of devices, whose operating system is used to start up the information processing apparatus is stored in a startup device storage before the information processing apparatus is turned off, and wherein based upon the device identification stored in the startup device storage, the operating system in the device is started up to resume the information processing apparatus to the arbitrary operational state when it is determined in the determining step that the information processing apparatus is resumed from the hibernation state.

6. The method of starting up the information processing apparatus according to claim 5, wherein the information processing apparatus is booted up based on a normal boot-up sequence of the information processing apparatus when it is determined in the determining step that the information processing apparatus is not resumed from the hibernation state.

7. A startup program of an information processing apparatus having a hibernation state, the startup program causing a computer to execute the steps of:

storing information required to resume the information processing apparatus from the hibernation state to an arbitrary operational state when the information processing apparatus is shifted from the arbitrary operational state to the hibernation state;

turning off the information processing apparatus;

turning on the information processing apparatus with a plurality of turning-on processes;

determining whether the information processing apparatus is resumed from the hibernation state when the information processing apparatus is turned on after the information processing apparatus is turned off; and resuming the information processing apparatus from the hibernation state to the arbitrary operational state based on the required information when it is determined in the determining step that the information processing apparatus is resumed from the hibernation state, wherein, the resuming step includes skipping at least one of the turning-on processes which is not indispensable for resuming when it is determined in the determining step that the information processing apparatus is resumed from the hibernation state, and wherein the information processing apparatus further includes a plurality of devices capable of providing a plurality of operating systems, and wherein the startup program causes the computer to execute a step of storing an identification of a device among the plurality of devices, whose operating system is used to start up the information processing apparatus in a startup device storage before the information processing apparatus is turned off; and a step of starting up the operating system in the device based upon the device identification stored in the startup device storage to resume the information processing apparatus to the arbitrary operational state when it is determined in the determining step that the information processing apparatus is resumed from the hibernation state.

8. The startup program of the information processing apparatus according to claim 7, wherein the startup program causes the computer to execute a step of booting up the information processing apparatus based on a normal boot-up sequence of the information processing apparatus when it is determined in the determining step that the information processing apparatus is not resumed from the hibernation state.

* * * * *